US012028879B2

(12) United States Patent
Shan (10) Patent No.: US 12,028,879 B2
(45) Date of Patent: Jul. 2, 2024

(54) COMMUNICATION METHOD, COMMUNICATIONS DEVICE, AND COMPUTER PROGRAM STORAGE MEDIUM (71) Applicant: Huawei Technologies Co., Ltd., Shenzhen (CN)

(72) Inventor: Baokun Shan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 907 days.

(21) Appl. No.: 16/990,672

(22) Filed: Aug. 11, 2020

(65) Prior Publication Data

US 2020/0374886 A1 Nov. 26, 2020

Related U.S. Application Data (63) Continuation of application No. PCT/CN2018/076527, filed on Feb. 12, 2018.

(51) Int. Cl.
*H04W 72/53* (2023.01)
*H04L 27/26* (2006.01)
(Continued)

(52) U.S. Cl.
CPC ......... *H04W 72/53* (2023.01); *H04L 27/2607* (2013.01); *H04W 68/005* (2013.01);
(Continued)

(58) Field of Classification Search
CPC ............... H04W 72/53; H04W 68/005; H04W 72/0453; H04W 72/23; H04W 74/0833;
(Continued)

(56) References Cited

U.S. PATENT DOCUMENTS 6,981,207 B1 * 12/2005 Bakman ................ G06F 40/174
715/210
10,149,125 B1 * 12/2018 Oroskar ............... H04B 7/0404
(Continued)

FOREIGN PATENT DOCUMENTS

CN 102843723 A 12/2012
WO 2017123405 A1 7/2017
(Continued)

OTHER PUBLICATIONS

"Combinations with standalone and in-band or guard-band carrier," 3GPP TSG RAN WG2 Meeting #101, R2-1802232, Athens, Greece, pp. 1-11, 3rd Generation Partnership Project, Valbonne, France (Feb. 26-Mar. 2, 2018).
(Continued)

*Primary Examiner* — Thuong Nguyen
(74) *Attorney, Agent, or Firm* — Leydig, Voit & Mayer, Ltd.

(57) ABSTRACT

A communication method includes: a network device sends first configuration information to a terminal device, where the first configuration information includes configuration information of a non-anchor carrier; and when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode.

20 Claims, 3 Drawing Sheets (51) Int. Cl.
  *H04W 68/00* (2009.01)
  *H04W 72/0453* (2023.01)
  *H04W 72/23* (2023.01)
  *H04W 74/0833* (2024.01)

(52) U.S. Cl.
  CPC ....... *H04W 72/0453* (2013.01); *H04W 72/23* (2023.01); *H04W 74/0833* (2013.01)

(58) Field of Classification Search
  CPC .. H04W 72/00; H04L 27/2607; H04L 5/0092; H04L 5/001; H04L 5/0053
  USPC .......................... 370/329, 216; 375/347, 340
  See application file for complete search history.

(56) References Cited

U.S. PATENT DOCUMENTS

| | | | |
|---|---|---|---|
| 2002/0059404 A1* | 5/2002 | Schaaf ................ | H04M 1/2535 709/220 |
| 2007/0087615 A1* | 4/2007 | Paulsen ................ | H04L 43/50 439/378 |
| 2010/0130218 A1 | 5/2010 | Zhang et al. | |
| 2010/0195772 A1* | 8/2010 | Kodama ............. | H04L 27/2656 375/340 |
| 2012/0287869 A1* | 11/2012 | Xi ........................... | H04B 7/06 370/329 |
| 2015/0092897 A1* | 4/2015 | Huang ................ | H04L 27/2647 375/347 |
| 2019/0141578 A1* | 5/2019 | Tang ..................... | H04W 28/18 |
| 2019/0349775 A1* | 11/2019 | Sui ........................ | H04W 16/14 |
| 2020/0213042 A1* | 7/2020 | Zhu ....................... | H04W 80/02 |
| 2021/0067282 A1* | 3/2021 | Yan ........................ | H04W 48/10 |
| 2021/0307059 A1* | 9/2021 | Rathonyi .......... | H04W 74/0833 |

FOREIGN PATENT DOCUMENTS

| | | |
|---|---|---|
| WO | 2017133702 A1 | 8/2017 |
| WO | 2017167839 A1 | 10/2017 |
| WO | 2017192624 A1 | 11/2017 |
| WO | 2017213795 A1 | 12/2017 |

OTHER PUBLICATIONS

"Rel-14 dedicated carrier configuration," 3GPP TSG-RAN WG2 #97, Tdoc R2-1700770, Athens, Greece, pp. 1-5, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.0.1, pp. 1-776, 3rd Generation Partnership Project, Valbonne, France (Jan. 2018).

"Revised WID on Further NB-IoT enhancements," 3GPP TSG RAN Meeting #77, RP-172063 (revision of RP-171428), Sapporo, Japan, pp. 1-6, 3rd Generation Partnership Project, Valbonne, France (Sep. 11-14, 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0, pp. 1-338, 3rd Generation Partnership Project, Valbonne, France (Dec. 2017).

"On downlink TDD NB-IoT," 3GPP TSG RAN WG1 Meeting #91, R1-1719477, Reno, USA, pp. 1-5, 3rd Generation Partnership Project, Valbonne, France (Nov. 27-Dec. 1, 2017).

ZTE, "Consideration on TDD support in FeNB-IoT", R2-1710978, 3GPP TSG-RAN WG2 Meeting#99, Prague, Czech Republic, 6 pages, 3rd Generation Partnership Project, Valbonne, France (Oct. 9-13, 2017).

* cited by examiner

COMMUNICATION METHOD, COMMUNICATIONS DEVICE, AND COMPUTER PROGRAM STORAGE MEDIUM

CROSS-REFERENCE TO RELATED APPLICATIONS

This application is a continuation of International Application No. PCT/CN2018/076527, filed on Feb. 12, 2018, the disclosure of which is hereby incorporated by reference in its entirety.

TECHNICAL FIELD

This application relates to the communications field, and more specifically, to a communication method, a communications device, and a computer program storage medium.

BACKGROUND

In a 5G new radio (NR) project in a 5th generation (5G) mobile communications technology, the internet of things (IoT) will become an important application in the future communications field. The IoT may cover smart metering, medical examination and monitoring, logistics inspection, industrial inspection and monitoring, internet of vehicles, smart communities, communication of wearable devices, and other fields. A typical cellular internet of things is narrowband-IoT (NB-IoT).

In an existing NB-IoT release, to reduce complexity of a terminal, there is a limitation on operators' deployment modes of an anchor carrier and a non-anchor carrier. In latest discussion on the NB-IoT, it is expected that supported carrier deployment combinations can be extended (four unsupported carrier deployment combinations are changed to four supported carrier deployment combinations). However, the foregoing new deployment mode combinations need to be implemented in a new release, but an existing NB-IoT terminal can support only a conventional deployment mode, and cannot support the new deployment mode combinations. Consequently, if a new carrier deployment combination is directly configured in a corresponding carrier configuration, the old-version (existing) NB-IoT terminal is incompatible.

Therefore, how to avoid impact of the new carrier deployment mode combinations on the NB-IoT terminal in an existing network becomes an urgent problem to be resolved.

SUMMARY

This application provides a communication method, a communications device, and a computer program storage medium, to avoid impact of a new carrier deployment mode combination on an NB-IoT terminal in an existing network.

According to a first aspect, a communication method is provided. The communication method includes: sending, by a network device, first configuration information to a terminal device, where the first configuration information includes configuration information of a non-anchor carrier; and when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode.

In the foregoing technical solution, the network device provides the configuration information of the non-anchor carrier for the terminal device to use, so that the carriers can use four new deployment mode combinations. This can avoid incompatibility of an NB-IoT terminal in an existing network caused by an increase in supported carrier deployment mode combinations.

In a possible implementation, the method further includes: sending, by the network device, the first configuration information and second configuration information to the terminal device, where the second configuration information includes configuration information of the non-anchor carrier; and when the anchor carrier is in the in-band deployment mode, the non-anchor carrier uses the in-band deployment mode or the guard-band deployment mode; when the anchor carrier is in the guard-band deployment mode, the non-anchor carrier uses the in-band deployment mode or the guard-band deployment mode; or when the anchor carrier is in the standalone deployment mode, the non-anchor carrier uses the standalone deployment mode.

In the foregoing technical solution, the network device provides the terminal device with two types of configuration information of the non-anchor carrier. The first type of configuration information of the non-anchor carrier may enable the carriers to use four new deployment mode combinations, and the second type of configuration information of the non-anchor carrier may enable the carriers to use the old deployment mode combinations. This can avoid incompatibility of the NB-IoT terminal in the existing network caused by the increase in the supported carrier deployment mode combinations.

In a possible implementation, when the anchor carrier is in the standalone deployment mode, and the non-anchor carrier uses the in-band deployment mode, the configuration information, of the non-anchor carrier, in the first configuration information includes the following information about a long term evolution LTE cell: if an ID of a physical cell of the non-anchor carrier is the same as an ID of the LTE cell, the information about the LTE cell includes information about a quantity of symbols occupied by a control channel of the LTE cell; or a reference signal from the non-anchor carrier to an LTE center frequency.

In the foregoing technical solution, the network device may provide the corresponding configuration information of the non-anchor carrier for the terminal device to use, to support more carrier deployment mode combinations.

In a possible implementation, when the anchor carrier is in the standalone deployment mode, and the non-anchor carrier uses the in-band deployment mode, the configuration information, of the non-anchor carrier, in the first configuration information includes the following information about the long term evolution LTE cell: if an ID of the physical cell of the non-anchor carrier is different from the ID of the LTE cell, the information about the LTE cell includes the information about the quantity of symbols occupied by the control channel of the LTE cell; or port information of a cell-specific reference signal CRS of the LTE cell.

In the foregoing technical solution, the network device may provide the corresponding configuration information of the non-anchor carrier for the terminal device to use, to support more carrier deployment mode combinations.

In a possible implementation, when the non-anchor carrier uses the guard-band deployment mode or the standalone deployment mode, the configuration information of the non-anchor carrier includes first indication information, and the first indication information includes: information indicates that the non-anchor carrier uses the guard-band deployment mode; or information indicates that the non-anchor carrier uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: when the anchor carrier is in the standalone deployment mode, a non-anchor carrier used for paging uses the in-band deployment mode or the guard-band deployment mode; or when the anchor carrier is in the guard-band deployment mode or the in-band deployment mode, a non-anchor carrier used for paging uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: when the anchor carrier is in the standalone deployment mode, a non-anchor carrier used for random access uses the in-band deployment mode or the guard-band deployment mode; or when the anchor carrier is in the guard-band deployment mode or the in-band deployment mode, a non-anchor carrier used for random access uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: when the anchor carrier is in the standalone deployment mode, a non-anchor carrier used for carrying a multicast service uses the in-band deployment mode or the guard-band deployment mode; or when the anchor carrier is in the guard-band deployment mode or the in-band deployment mode, a non-anchor carrier used for carrying a multicast service uses the standalone deployment mode.

In a possible implementation, the configuration information of the non-anchor carrier is carried on a system information block SIB 22.

In a possible implementation, the configuration information of the non-anchor carrier is carried on a multimedia broadcast multicast service control channel SC-MCCH.

In a possible implementation, a sum of a quantity of carriers configured in the first configuration information and a quantity of carriers configured in the second configuration information is not greater than a maximum value of the quantity of carriers configured in the second configuration information.

According to a second aspect, a communication method is provided. The communication method includes: receiving, by a terminal device, first configuration information sent by a network device, where the first configuration information includes configuration information of a non-anchor carrier; and when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode.

In a possible implementation, the method further includes: receiving, by the terminal device, the first configuration information and second configuration information that are sent by the network device, where the second configuration information includes configuration information of the non-anchor carrier; and when the anchor carrier is in the in-band deployment mode, the non-anchor carrier uses the in-band deployment mode or the guard-band deployment mode; when the anchor carrier is in the guard-band deployment mode, the non-anchor carrier uses the in-band deployment mode or the guard-band deployment mode; or when the anchor carrier is in the standalone deployment mode, the non-anchor carrier uses the standalone deployment mode.

In a possible implementation, when the anchor carrier is in the standalone deployment mode, and the non-anchor carrier uses the in-band deployment mode, the configuration information, of the non-anchor carrier, in the first configuration information includes the following information about a long term evolution LTE cell: if an ID of a physical cell of the non-anchor carrier is the same as an ID of the LTE cell, the information about the LTE cell includes information about a quantity of symbols occupied by a control channel of the LTE cell; or a reference signal from the non-anchor carrier to an LTE center frequency.

In a possible implementation, when the anchor carrier is in the standalone deployment mode, and the non-anchor carrier uses the in-band deployment mode, the configuration information, of the non-anchor carrier, in the first configuration information includes the following information about the long term evolution LTE cell: if an ID of the physical cell of the non-anchor carrier is different from the ID of the LTE cell, the information about the LTE cell includes the information about the quantity of symbols occupied by the control channel of the LTE cell; or port information of a cell-specific reference signal CRS of the LTE cell.

In a possible implementation, when the non-anchor carrier uses the guard-band deployment mode or the standalone deployment mode, the configuration information of the non-anchor carrier includes first indication information, and the first indication information includes: information indicates that the non-anchor carrier uses the guard-band deployment mode; or information indicates that the non-anchor carrier uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: concatenating, by the terminal device, the first configuration information behind the second configuration information, to form third configuration information; and selecting, by the terminal device from the third configuration information, a non-anchor carrier used for paging, where when the anchor carrier is in the standalone deployment mode, the non-anchor carrier used for paging uses the in-band deployment mode or the guard-band deployment mode; or when the anchor carrier is in the guard-band deployment mode or the in-band deployment mode, the non-anchor carrier used for paging uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: concatenating, by the terminal device, the first configuration information behind the second configuration information, to form third configuration information; and selecting, by the terminal device from the third configuration information, a non-anchor carrier used for random access, where when the anchor carrier is in the standalone deployment mode, the non-anchor carrier used for random access uses the in-band deployment mode or the guard-band deployment mode; or when the anchor carrier is in the guard-band deployment mode or the in-band deployment mode, the non-anchor carrier used for random access uses the standalone deployment mode.

In a possible implementation, that when an anchor carrier is in a standalone deployment mode, the non-anchor carrier uses an in-band deployment mode or a guard-band deployment mode; or when an anchor carrier is in an in-band deployment mode or a guard-band deployment mode, the non-anchor carrier uses a standalone deployment mode includes: concatenating, by the terminal device, the first configuration information behind the second configuration information, to form third configuration information; and selecting, by the terminal device from the third configuration information, a non-anchor carrier used for sending a multicast service, where when the anchor carrier is in the standalone deployment mode, the non-anchor carrier used for sending the multicast service uses the in-band deployment mode or the guard-band deployment mode; or when the anchor carrier is in the guard-band deployment mode or the in-band deployment mode, the non-anchor carrier used for sending the multicast service uses the standalone deployment mode.

In a possible implementation, the configuration information of the non-anchor carrier is carried on a system information block SIB 22.

In a possible implementation, the configuration information of the non-anchor carrier is carried on a multimedia broadcast multicast service control channel SC-MCCH.

In a possible implementation, a sum of a quantity of carriers configured in the first configuration information and a quantity of carriers configured in the second configuration information is not greater than a maximum value of the quantity of carriers configured in the second configuration information.

According to a third aspect, a communications device is provided. The communications device includes at least one processor and a communications interface, and the communications interface is used by the communications device to exchange information with another communications device. When a program instruction is executed in the at least one processor, the communications device is enabled to implement a function on either of the network device and the terminal device in the method according to any one of the first aspect or the possible implementations of the first aspect or any one of the second aspect or the possible implementations of the second aspect.

According to a fourth aspect, a computer program storage medium is provided. The computer program storage medium has a program instruction; and when the program instruction is directly or indirectly executed, a function on either of the network device and the terminal device in the method according to any one of the first aspect or the possible implementations of the first aspect or any one of the second aspect or the possible implementations of the second aspect is implemented.

According to a fifth aspect, a chip system is provided. The chip system includes at least one processor. When a program instruction is executed in the at least one processor, a function on either of the network device and the terminal device in the method according to any one of the first aspect or the possible implementations of the first aspect or any one of the second aspect or the possible implementations of the second aspect is implemented.

According to a sixth aspect, a communications system is provided. The communications system includes the communications device according to the third aspect.

DESCRIPTION OF EMBODIMENTS

The following describes example technical solutions of this application with reference to the accompanying drawings.

The technical solutions in the embodiments of this application may be applied to various communications systems that require terminals with low complexity and low power consumption, for example, a cellular-based narrowband internet of things (NB-IoT) system, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, a future 5th generation (5G) system, or new radio (NR).

A type of a terminal device is not specifically limited in the embodiments of this application. For example, the terminal device may be user equipment, an access terminal, a terminal device, a subscriber unit, a subscriber station, a mobile station, a remote station, a remote terminal, a mobile device, a user terminal, a wireless network device, a user agent, or a user apparatus. The terminal may include but is not limited to a mobile station (MS), a mobile phone, user equipment (UE), a handset, portable equipment, a cellular phone, a cordless phone, and a session initiation protocol (SIP) phone, a wireless local loop (WLL) station, a personal digital assistant (PDA), and a radio frequency identification (RFID) terminal device used for logistics, a handheld device or a computing device with a wireless communication function, another device connected to a wireless modem, a vehicle-mounted device, a wearable device, a terminal device in an internet of things or an internet of vehicles, a terminal device in a future 5G network, a terminal device in a future evolved public land mobile network (PLMN), or the like.

By way of example and not limitation, in the embodiments of the present application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

A type of a network device is not specifically limited in the embodiments of this application. The network device may be any device configured to communicate with the terminal device. For example, the network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in a long term evolution (LTE) system, or a radio controller in a cloud radio access network (CRAN) scenario. Alternatively, the network device may be, for example, a relay station, an access point, a vehicle-mounted device, a wearable device, a network device in a future 5G network, or a network device in a future evolved PLMN network.

In a possible implementation, the network device may include a centralized unit (CU) and a distributed unit (DU). One CU may be connected to one DU, or a plurality of DUs may share one CU, to reduce costs and facilitate network expansion. The CU and the DU may be split based on a protocol stack. In a possible manner, a radio resource control (RRC) layer, a service data adaptation protocol (SDAP) layer, and a packet data convergence protocol (PDCP) layer are deployed on the CU, and a remaining radio link control (RLC) layer, media access control (MAC) layer, and physical layer are deployed on the DU.

Deployment modes of involved carriers are not specifically limited in the embodiments of this application. In an example, a carrier may be deployed in a standalone deployment mode (standalone), and the carrier in the standalone deployment mode may not depend on another communications system. For example, deployment bandwidth of the carrier in the standalone deployment mode may be completely decoupled from a long term evolution (LTE) cell. In another example, the carrier may be deployed in a guard-band deployment mode (guardband), and the carrier in the guard-band deployment mode may not occupy a resource of another communications system. For example, the carrier in the guard-band deployment mode may not occupy an LTE resource, and may be deployed on an unused resource block in an LTE edge guard band. In another example, the carrier may alternatively be deployed in an in-band deployment mode (inband), and the carrier in the in-band deployment mode may be deployed in operating bandwidth of another communications system. For example, the carrier in the in-band deployment mode may be deployed in operating bandwidth of LTE.

Classification of the involved carriers is not specifically limited in the embodiments of this application. The carriers may be classified into different types based on different information carried on the carriers. In an example, a carrier that carries a synchronization signal and a system broadcast may be referred to as an anchor carrier. In another example, a carrier that carries unicast transmission, paging, and random access may be referred to as a non-anchor carrier.

The following uses three carrier deployment modes (standalone, guardband, and inband) and two carrier classifications (the anchor carrier and the non-anchor carrier) as an example for description.

It is noted above that, combinations of the three deployment modes of the anchor carrier and the three deployment modes of the non-anchor carrier are limited in an existing NB-IoT release (Rel-13/14), to reduce complexity of the terminal. Table 1 lists anchor and non-anchor carrier deployment combinations (anchor and non-anchor carrier deployment combinations). In combinations of the three carrier deployment modes (the standalone deployment mode standalone, the guard-band deployment mode guardband, and the in-band deployment mode inband) of the anchor carrier and the three carrier deployment modes of the non-anchor carrier, four deployment mode combinations are not supported (invalid): When the anchor carrier is in the standalone deployment mode, the non-anchor carrier is in the in-band deployment mode or the guard-band deployment mode; and when the anchor carrier is in the in-band deployment mode or the guard-band deployment mode, the non-anchor carrier is in the standalone deployment mode.

TABLE 1

Anchor and non-anchor carrier deployment combinations

| | | Anchor carrier | | |
|---|---|---|---|---|
| | | Inband | Guardband | Standalone |
| Non-anchor carrier | Inband | Valid (note 1) | Valid (note 1) | Invalid |
| | Guardband | Valid (note 1) | Valid (note 1) | Invalid |
| | Standalone | Invalid | Invalid | Valid (note 2) |

In the latest discussion, it is expected that the foregoing four invalid carrier deployment combinations may be changed to supported (valid) carrier deployment combinations. If the four supported carrier deployment combinations are directly configured in a corresponding carrier configuration, an old-version (existing) NB-IoT terminal is incompatible.

The following describes in detail a communication method provided in an embodiment of this application.

Figure 1:
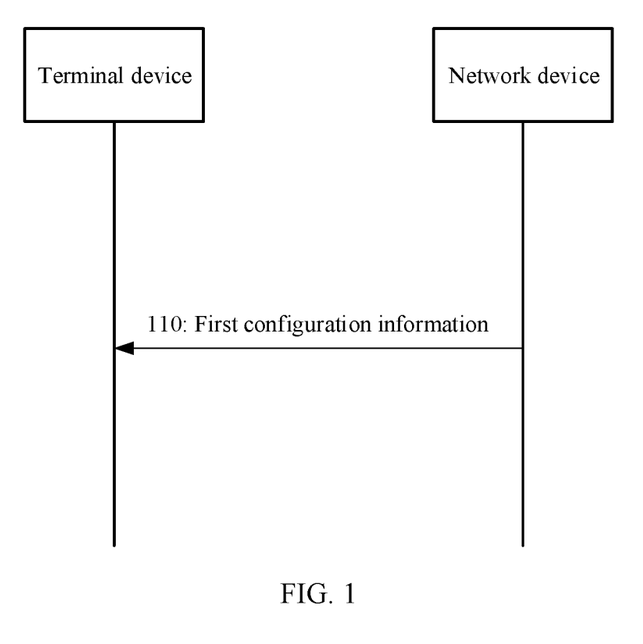
FIG. 1 is a schematic flowchart of a communication method according to an embodiment of this application.

FIG. 1 is a schematic flowchart of a communication method according to an embodiment of this application. The method in FIG. 1 includes the following steps.

Step 110: A network device sends first configuration information to a terminal device, where the first configuration information includes configuration information of a non-anchor carrier.

In this embodiment of this application, the network device may provide the configuration information of the non-anchor carrier for the terminal device to use. The non-anchor carrier may use four new carrier deployment combinations. A new carrier deployment combination is not directly configured in a corresponding carrier configuration. This can avoid incompatibility of an NB-IoT terminal in an existing network caused by increasing carrier deployment mode combinations.

In this embodiment of this application, the network device may send the first configuration information to the terminal device, the first configuration information may include configuration information of each non-anchor carrier, and the first configuration information may also be referred to as a first configuration information list. The non-anchor carrier in the first configuration information may use at least one of the following four new carrier deployment mode combinations.

When an anchor carrier is in a standalone deployment mode, the non-anchor carrier in the first configuration information may use an in-band deployment mode. When the anchor carrier is in the standalone deployment mode, the non-anchor carrier in the first configuration information may use a guard-band deployment mode. When the anchor carrier is in the in-band deployment mode, the non-anchor carrier in the first configuration information may use the standalone deployment mode. When the anchor carrier is in the guard-band deployment mode, the non-anchor carrier in the first configuration information may use the standalone deployment mode. In other words, a scenario to which the non-anchor carrier in the first configuration information may be applied includes at least one of the four invalid carrier deployment combinations in Table 1.

In this embodiment of this application, the configuration information, of the non-anchor carrier, that may be included in the first configuration information is not specifically limited, and may be any configuration information, of the non-anchor carrier, that can be used by the terminal device.

Optionally, in some embodiments, if the anchor carrier is deployed in the standalone deployment mode, when the non-anchor carrier is in the in-band deployment mode, the network device may send related information of an LTE cell in the configuration information of each non-anchor carrier. In an example, the configuration information of the non-anchor carrier may include information about a quantity of symbols occupied by a control channel of the LTE cell. In another example, when a physical cell ID (PCI) of the non-anchor carrier is the same as an ID of the LTE cell, the configuration information of the non-anchor carrier may further include a reference signal from the non-anchor carrier to an LTE center frequency. In another example, when the physical cell ID (PCI) of the non-anchor carrier is different from the ID of the LTE cell, the configuration information of the non-anchor carrier may further include port information of a cell-specific reference signal (CRS) of the LTE cell.

Optionally, in some embodiments, if the anchor carrier is deployed in the standalone deployment mode, when the non-anchor carrier is deployed in the standalone deployment mode or the guard-band deployment mode, the configuration information, of the non-anchor carrier, in the first configuration information may include first indication information, and the first indication information may indicate, to the terminal device, whether the anchor carrier is deployed in the standalone deployment mode or the guard-band deployment mode.

The following describes, in more detail with reference to specific signaling, the configuration information, of the non-anchor carrier, in the first configuration information in this embodiment of this application.

| Carrier Config Dedicated-NB information elements | |
|---|---|
| DL-Carrier Config Dedicated-NB-r13 ::= | SEQUENCE{ |
|     dl-Carrier Freq-r13 | CarrierFreq-NB-r13, |
| ....... | |
|     inband Carrier Info-r13 | SEQUENCE{ |
|         samePCI-Indicator-r13 | CHOICE    { |
|             samePCI-r13 | SEQUENCE{ |
|                 index To Mid PRB-r13 | INTEGER (−55..54) |
|         }, | |
|            differentPCI-r13 | SEQUENCE{ |
|                eutra-Num CRS-Ports-r13 | ENUMERATED {same, four} |
|         } | |
|            OPTIONAL, | --Cond anchor-guardband-or-standalone |
|     } | |
|     entea Control Region Size-r13 | ENUMERATED {n1, n2, n3} |
| } | |
|            OPTIONAL, | --Cond non-anchor-inband |
|     guardband- standalone Carrier Info-r15 | Enumerated{ guardband , standalone } |
|            OPTIONAL, | --Cond non-anchor-guardband-or-standalone |
| ....... | |
| } | |
| --ASN1 STOP | |

Specifically, "inband Carrier Info-r13" in the foregoing signaling may be used to represent the configuration information of the carrier, and the carrier may use the in-band deployment mode.

"entea Control Region Size-r13" in the foregoing signaling may be used to represent that if the anchor carrier is deployed in the standalone deployment mode, when the non-anchor carrier may use the in-band deployment mode, the configuration information of the non-anchor carrier may include the information about the quantity of symbols occupied by the control channel of the LTE cell.

"samePCI-Indicator-r13" in the foregoing signaling may be used to represent the configuration information of the non-anchor carrier used when the anchor carrier is deployed in the standalone deployment mode, the non-anchor carrier may use the in-band deployment mode, and the PCI of the non-anchor carrier is the same as or different from the ID of the LTE cell.

"samePCI-r13" and "index To Mid PRB-r13" in the foregoing signaling may be used to represent that if the PCI of the non-anchor carrier is the same as the ID of the LTE cell, the configuration information of the non-anchor carrier may include the reference signal from the non-anchor carrier to the LTE center frequency.

"differentPCI-r13" and "eutra-Num CRS-Ports-r13" in the foregoing signaling may be used to represent that if the PCI of the non-anchor carrier is the same as the ID of the LTE cell, the configuration information of the non-anchor carrier may include the port information of the CRS of the LTE cell.

"Cond non-anchor-guardband-or-standalone" in the foregoing signaling may be used to represent that if the non-anchor carrier may be deployed in the standalone deployment mode or the guard-band deployment mode, the configuration information of the non-anchor carrier may include the indication information, and the indication information may be used to indicate whether the non-anchor carrier is deployed in the standalone deployment mode or the guard-band deployment mode.

"non-anchor-inband" in the foregoing signaling may be used to represent that: the field mandatorily represents that the non-anchor carrier may use the in-band deployment mode; otherwise, the field is not present. (The field is mandatory present if the non-anchor carrier is an inband carrier; otherwise it is not present.)

"non-anchor-guardband-or-standalone" in the foregoing signaling may be used to represent that: the field mandatorily represents that the non-anchor carrier may use the guard-band deployment mode or the standalone deployment mode; otherwise, the field is not present. (The field is mandatory present if the non-anchor carrier is a guardband or standalone carrier; otherwise it is not present.)

"anchor-guardband-or-standalone" in the foregoing signaling may be used to represent that: the field mandatorily represents that the anchor carrier may use the guard-band deployment mode or the standalone deployment mode; otherwise, the field is not present. (The field is mandatory present if operation Mode Info is set to guardband or standalone in the MIB; otherwise it is not present.)

In this embodiment of this application, the network device sends the configuration information of the non-anchor carrier to the terminal device for use. This can avoid incompatibility of the NB-IoT terminal in the existing network caused by increasing the carrier deployment mode combinations.

Optionally, in some embodiments, the method in FIG. 1 further includes: the network device may send the first configuration information and second configuration information to the terminal device, where the first configuration information and the second configuration information each may include configuration information of the non-anchor carrier. The non-anchor carrier in the first configuration information may use at least one of the foregoing four new carrier deployment combinations (for example, at least one of the four invalid combinations in Table 1: when the anchor carrier is in the standalone deployment mode, the non-anchor carrier uses the in-band deployment mode or the guard-band deployment mode; and when the anchor carrier is in the in-band deployment mode or the guard-band deployment mode, the non-anchor carrier uses the standalone deployment mode). The non-anchor carrier in the second configuration information may use an old carrier deployment combination (for example, at least one of the five valid combinations in Table 1: when the anchor carrier is in the in-band deployment mode, the non-anchor carrier uses the in-band deployment mode or the guard-band deployment mode; when the anchor carrier is in the guard-band deployment mode, the non-anchor carrier uses the in-band deployment mode or the guard-band deployment mode; and when the anchor carrier is in the standalone deployment mode, the non-anchor carrier uses the standalone deployment mode).

In this embodiment of this application, the network device separately sends, to the terminal device, the configuration information of each non-anchor carrier that can use the new deployment combination and configuration information of the non-anchor carrier that can use the old deployment combination, for use by the terminal device. This can avoid incompatibility of the NB-IoT terminal in the existing network caused by increasing the carrier deployment mode combinations.

Optionally, in some embodiments, the network device may send, to the terminal device, configuration information of a non-anchor carrier used for paging (where, for configuration information of the non-anchor carrier, refer to the foregoing descriptions, and details are not described herein again). When the anchor carrier is in the standalone deployment mode, the non-anchor carrier may use the in-band deployment mode or the guard-band deployment mode. When the anchor carrier is in the guard-band deployment mode or the in-band deployment mode, the non-anchor carrier may use the standalone deployment mode.

Optionally, in some embodiments, the terminal device may receive the configuration information, of the non-anchor carrier, that is sent by the network device, and may receive paging based on the corresponding configuration information of the non-anchor carrier.

Optionally, in some embodiments, the network device may send, to the terminal device, configuration information used for random access. When the anchor carrier is in the standalone deployment mode, the non-anchor carrier may use the in-band deployment mode or the guard-band deployment mode. When the anchor carrier is in the guard-band deployment mode or the in-band deployment mode, the non-anchor carrier may use the standalone deployment mode.

Optionally, in some embodiments, the terminal device may receive the configuration information, of the non-anchor carrier, that is sent by the network device, and may randomly select an uplink carrier for initiating random access.

Optionally, in some embodiments, the configuration information, of the non-anchor carrier, that is sent by the network device to the terminal device may be carried on a system information block (SIB) 22. In an example, the network device may broadcast the SIB 22, to send the configuration information of the non-anchor carrier to the terminal device.

Figure 2:
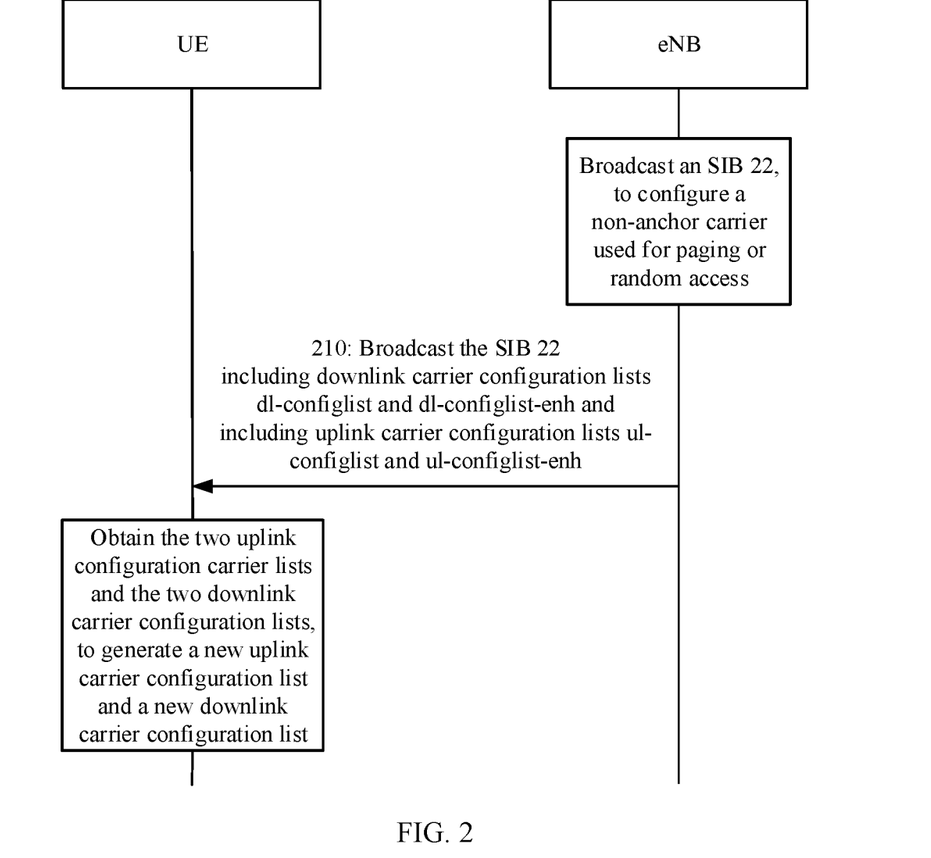
FIG. 2 is a schematic flowchart of a communication method according to another embodiment of this application.

The following describes, in more detail with reference to a specific example, a method for sending and using the configuration information of the non-anchor carrier used for paging or random access in this embodiment of this application. It should be noted that the example in FIG. 2 is merely intended to help a person skilled in the art understand the embodiments of this application, instead of limiting the embodiments of this application to a specific value or a specific scenario shown in the example. A person skilled in the art can apparently make various equivalent modifications or changes based on the example shown in FIG. 2, and such modifications and changes also fall within the scope of the embodiments of this application.

It should be understood that an eNodeB (eNB) in FIG. 2 may correspond to the foregoing network device, and user equipment (UE) may correspond to the foregoing terminal device.

In step 210, a carrier configuration information list that can be sent by the eNB to the UE in a system broadcast may be carried by an SIB 22. The carrier configuration information list may include a downlink carrier configuration list (dl-configlist), an enhanced downlink carrier configuration list (dl-configlist-enh), an uplink carrier configuration list (ul-configlist), and an enhanced uplink carrier configuration list (ul-configlist-enh). The foregoing four carrier configuration lists may include configuration information of each non-anchor carrier. The following describes the foregoing four carrier configuration lists in detail.

The non-anchor carrier in the downlink carrier configuration list (dl-configlist) may use at least one of the five valid combinations in Table 1, and the non-anchor carrier may be used for paging.

The non-anchor carrier in the uplink carrier configuration list (ul-configlist) may use at least one of the five valid combinations in Table 1, and the non-anchor carrier may be used for random access.

If the anchor carrier may be deployed in the standalone deployment mode (standalone), configuration information of the non-anchor carrier (non-anchor carrier) that is used for paging and that uses the in-band deployment mode (inband) or the guard-band deployment mode (guardband) may be configured in the enhanced downlink configuration list (dl-configlist-enh, that is, the foregoing first configuration information or first configuration information list). The non-anchor carrier may use at least one of the four invalid combinations in Table 1.

If the anchor carrier may be deployed in the in-band deployment mode (inband) or the guard-band deployment mode (guardband), configuration information of the non-anchor carrier that is used for paging and that uses the standalone deployment mode (standalone) may be configured in the enhanced downlink configuration list (dl-configlist-enh, that is, the foregoing first configuration information or first configuration information list). The non-anchor carrier may use at least one of the four invalid combinations in Table 1.

If the anchor carrier may be deployed in the standalone deployment mode (standalone), configuration information of the non-anchor carrier that is used for random access and that uses the in-band deployment mode (inband) or the guard-band deployment mode (guardband) may be configured in the enhanced uplink configuration list (ul-configlist-enh, that is, the foregoing first configuration information or first configuration information list). The non-anchor carrier may use at least one of the four invalid combinations in Table 1.

If the anchor carrier may be deployed in the in-band deployment mode (inband) or the guard-band deployment mode (guardband), configuration information of the non-anchor carrier that is used for random access and that uses the standalone deployment mode (standalone) may be configured in the enhanced uplink configuration list (ul-configlist-enh, that is, the foregoing first configuration information or first configuration information list). The non-anchor carrier may use at least one of the four invalid combinations in Table 1.

The UE may obtain the two uplink carrier configuration lists and the two downlink carrier configuration lists in the SIB 22, and may generate a new list of downlink carriers used for paging and a new list of uplink carriers used for random access.

Specifically, if the UE is an NB-IoT terminal device in an existing network, the UE may select a paging request of the UE from the downlink carrier configuration list (dl-configlist), and may receive paging based on the configuration information, of the non-anchor carrier, in the carrier configuration list.

If the UE is the NB-IoT terminal device in the existing network, the UE may randomly select, from the uplink carrier configuration list (ul-configlist), an uplink carrier that can initiate random access.

Specifically, if the UE is a new-version NB-IoT terminal device, the UE may concatenate the enhanced downlink carrier configuration list (dl-configlist-enh) behind the downlink carrier configuration list (dl-configlist), to generate a new downlink carrier configuration list. The UE may select a paging request of the UE from the new downlink carrier configuration list, and may receive paging based on the configuration information of the non-anchor carrier in the carrier configuration list.

If the UE is the new-version NB-IoT terminal device, the UE may concatenate the enhanced uplink carrier configuration list (ul-configlist-enh) behind the uplink carrier configuration list (ul-configlist), to generate a new uplink carrier configuration list. The UE may randomly select, from the new uplink carrier configuration list, an uplink carrier that can initiate random access.

It should be understood that non-anchor carrier in the enhanced uplink carrier configuration list (ul-configlist-enh) and the enhanced downlink carrier configuration list (dl-configlist-enh) in the system broadcast may use the following carrier deployment mode combinations.

If the anchor carrier is deployed in the standalone deployment mode, the non-anchor carrier used for paging or random access may use the in-band deployment mode or the guard-band deployment mode.

If the anchor carrier is deployed in the in-band deployment mode or the guard-band deployment mode, the non-anchor carrier used for paging or random access may use the standalone deployment mode.

It should be understood that a sum of a quantity of non-anchor carriers that can be configured in an enhanced carrier configuration list (for example, ul-configlist-enh or dl-configlist-enh) and a quantity of non-anchor carriers that can be configured in an original carrier configuration list (for example, ul-configlist or dl-configlist) cannot be greater than a maximum value of the quantity of non-anchor carriers that can be configured in the original carrier configuration list.

The following describes, in more detail with reference to specific signaling, the carrier configuration lists in the SIB 22 in this embodiment of this application.

| SystemInformationBlockType22-NB information element |
|---|

```
--ASN1START
SystemInformationBlockType22-NB-r14 ::=          SEQUENCE {
        dl-ConfigList-r14         DL-ConfigCommonList-NB-r14         OPTIONAL,     -- Need OR
        ul-ConfigList-r14         UL-ConfigCommonList-NB-r14         OPTIONAL,     -- Need OR
        pagingWeightAnchor-r14          PagingWeight-NB-r14          OPTIONAL,         -- Cond
pcch-config
        nprach-Probability AnchorList-r14                 NPRACH-ProbabilityAnchorList-NB-r14
OPTIONAL, -- Cond nprach
        lateNonCriticalExtension          OCTET STRING   OPTIONAL,
        ....,
```

-continued

| SystemInformationBlockType22-NB information element |
|---|
| [[ dl-ConfigList-Enh-r15 DL-ConfigCommonList-NB-r14 OPTIONAL, -- Need OR<br>ul-ConfigList-Enh-r15 UL-ConfigCommonList-NB-r14 OPTIONAL, -- Need OR<br>]]<br>} |

Specifically, "DL-ConfigCommonList-NB-r14" in the foregoing signaling may be used to represent the original downlink carrier configuration list.

"UL-ConfigCommonList-NB-r14" in the foregoing signaling may be used to represent the original uplink carrier configuration list.

"dl-ConfigList-Enh-r15" in the foregoing signaling may be used to represent the enhanced downlink carrier configuration list.

"ul-ConfigList-Enh-r15" in the foregoing signaling may be used to represent the enhanced uplink carrier configuration list.

"DL-ConfigCommonList-NB-r14" in the foregoing signaling may be used to represent that related configuration information of the non-anchor carrier in the original downlink carrier configuration list may be used for paging. (List of DL non-anchor carriers and associated configuration that can be used for paging and/or random access.)

"dl-ConfigList-Enh-r15" in the foregoing signaling represents that an evolved universal mobile telecommunications system terrestrial radio access network (E-UTRAN) may configure, in dl-ConfigList-Enh, a non-anchor carrier that uses the standalone deployment mode or the in-band deployment mode/the guard-band deployment mode. (E-UTRAN configures DL non-anchor carriers for which the mode of operation, standalone or inband/guardband, is different from the anchor carrier in dl-ConfigList-Enh.)

"dl-ConfigList-Enh-r15 DL-ConfigCommonList-NB-r14" in the foregoing signaling may be used to represent that if the UE can support an increase in the carrier deployment mode combinations, the enhanced downlink carrier configuration list and the original downlink carrier configuration list may be concatenated to form a new carrier configuration list, which may be used for paging. A sum of quantities of non-anchor carriers that can be configured in the enhanced carrier configuration list and the original carrier configuration list cannot be greater than a maximum value of the quantity of non-anchor carriers that can be configured in the original carrier configuration list. (If the UE supports operation mode enhancements, it appends dl-ConfigList-Enh to the end of dl-ConfigList to create a single list for paging and/or random access. The total maximum number of non-anchor carriers in dl-ConfigList and dl-ConfigList-Enh is maxNonAnchorCarriers-NB-r14.)

For "ul-ConfigList-Enh-r15 UL-ConfigCommonList-NB-r14" used in the foregoing signaling, refer to related descriptions of the signaling "dl-ConfigList-Enh-r15 DL-ConfigCommonList-NB-r14". Details are not described herein again.

Optionally, in some embodiments, when the anchor carrier is in the standalone deployment mode, and a non-anchor carrier used for carrying a multicast service uses the in-band deployment mode or the guard-band deployment mode, the network device may broadcast a service configuration information list to the terminal device. When the anchor carrier is in the guard-band deployment mode or the in-band deployment mode, and the non-anchor carrier used for carrying the multicast service uses the standalone deployment mode, the network device may broadcast the service configuration information list to the terminal device. The multicast service may be configured in the service configuration information list.

Optionally, in some embodiments, the service configuration information list sent by the network device to the terminal device may be carried on a multimedia broadcast multicast service control channel (multimedia broadcast multicast service control channel, SC-MCCH). In an example, the network device may send the service configuration information list to the terminal device by broadcasting the SC-MCCH.

Figure 3:
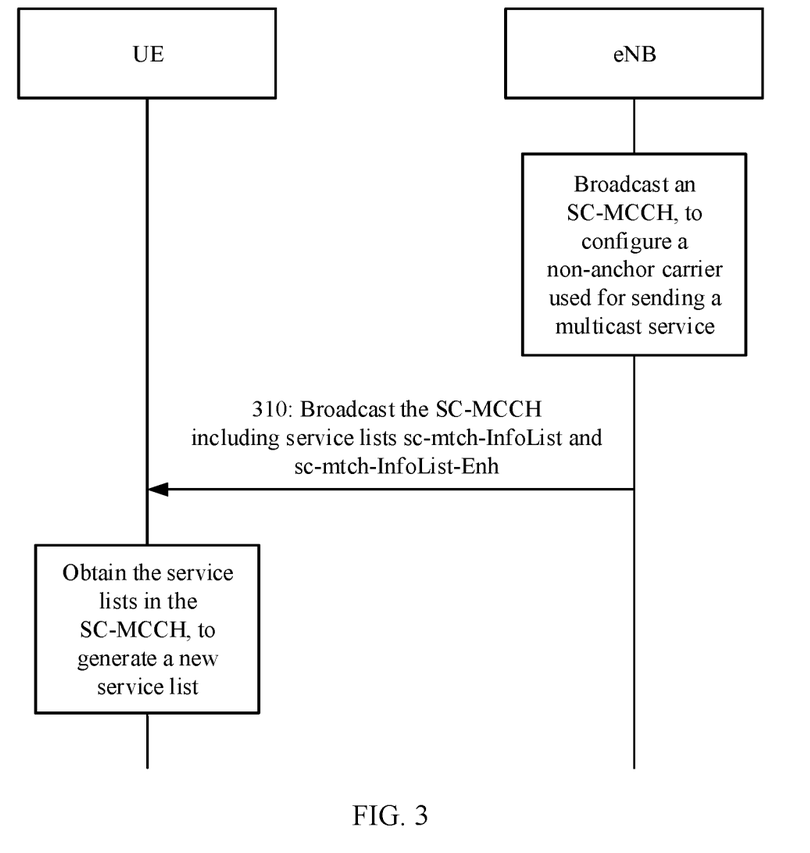
FIG. 3 is a schematic flowchart of a communication method according to another embodiment of this application.

The multicast service in this embodiment of this application is described in more detail below with reference to a specific example. It should be noted that the example in FIG. 3 is merely intended to help a person skilled in the art understand the embodiments of this application, instead of limiting the embodiments of this application to a specific value or a specific scenario shown in the example. A person skilled in the art can apparently make various equivalent modifications or changes based on the example shown in FIG. 3, and such modifications and changes also fall within the scope of the embodiments of this application.

In step 310, the service configuration information list that may be sent by the eNB to the UE in a system broadcast may be carried on the SC-MCCH, and may include an original service configuration information list (sc-mtch-InfoList) and an enhanced service configuration information list (sc-mtch-InfoList-Enh). For configuration information of a non-anchor carrier on which each service in the service configuration information list is carried, refer to the foregoing descriptions. Details are not described herein again. The following separately describes the foregoing two service configuration information lists in detail.

A multicast service that can be configured in the original service configuration information list (sc-mtch-InfoList) may be sent on a non-anchor carrier, and the non-anchor carrier may use at least one of the five valid combinations in Table 1.

If the anchor carrier is deployed in the standalone deployment mode (standalone), the non-anchor carrier used for carrying the multicast service may use the in-band deployment mode (inband) or the guard-band deployment mode (guardband). The multicast service may be configured and sent in the enhanced service configuration information list (sc-mtch-InfoList-Enh).

If the anchor carrier is deployed in the in-band deployment mode (inband) or the guard-band deployment mode (guardband), the non-anchor carrier used for carrying the multicast service may use the standalone deployment mode (standalone). The multicast service may be configured and sent in the enhanced service configuration information list (sc-mtch-InfoList-Enh).

The UE may obtain the original service configuration information list (sc-mtch-InfoList) and the enhanced service configuration information list (sc-mtch-InfoList-Enh) that are carried on the SC-MCCH, and may receive the multicast service on a corresponding carrier by using corresponding configuration information based on an ID of the service.

It should be understood that the non-anchor carrier that can send the multicast service and that is in the enhanced service configuration information list (sc-mtch-InfoList-Enh) in the system broadcast may use the following carrier deployment mode combinations.

If the anchor carrier is deployed in the standalone deployment mode, the non-anchor carrier used for sending the multicast service may use the in-band deployment mode or the guard-band deployment mode.

If the anchor carrier is deployed in the in-band deployment mode or the guard-band deployment mode, the non-anchor carrier used for sending the multicast service may use the standalone deployment mode.

It should be understood that a sum of a quantity of multicast services that can be configured in the enhanced service configuration information list (sc-mtch-InfoList-Enh) and a quantity of services that can be configured in the original service configuration information list (sc-mtch-InfoList) cannot be greater than a maximum value of the quantity of services that can be configured in the original service configuration information list.

The multicast service configuration information lists carried and sent on the SC-MCCH in this embodiment of this application are described in more detail below with reference to specific signaling.

Optionally, in some embodiments, for a positioning service, the terminal device may send, to the network device (which, for example, may be a base station or a positioning server), a capability of supporting the increase in the carrier deployment mode combinations. The positioning server may configure a carrier for the terminal device based on the supporting capability sent by the terminal device, to perform positioning measurement.

In this embodiment of this application, the method for using more carrier deployment mode combinations by the network device and the terminal device is designed, to avoid incompatibility of the NB-IoT terminal in the existing network caused by the increase in the supported carrier deployment mode combinations.

The communication method provided in the embodiments of the present application is described above in detail with reference to FIG. 1 to FIG. 3. A communications device provided in an embodiment of the present application is described below in detail with reference to FIG. 4.

Figure 4:
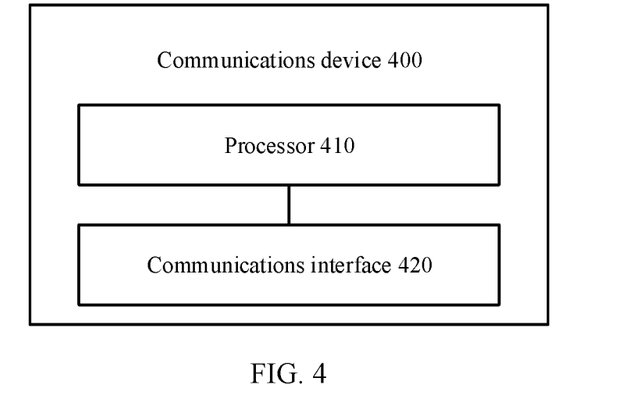
FIG. 4 is a schematic structural diagram of a communications device according to an embodiment of this application.

FIG. 4 is a schematic structural diagram of a communications device according to an embodiment of the present application. A communications device 400 in FIG. 4 may perform the communication method described in any one of the embodiments of FIG. 1 to FIG. 3. The communications device 400 in FIG. 4 may include at least one processor 410 and a communications interface 420. The communications interface 420 is used by the communications device 400 to exchange information with another communications device.

| SCPTMConfiguration-NB message |
|---|
| --ASN1START<br>SCPTMConfiguration-NB-r14 ::=    SEQUENCE {<br>   sc-mtch-InfoList-r14          SC-MTCH-InfoList-NB-r14,<br>   scptm-NeighbourCellList-r14        SCPTM-NeighbourCellList-NB-r14<br>OPTIONAL, --Need OP<br>   lateNonCriticalExtension          OCTET    STRING<br>OPTIONAL,<br>.....<br>   <u>sc-mtch-InfoList-Enh-r15</u>         <u>SC-MTCH-InfoList-NB-r14.</u><br>} |

Specifically, "sc-mtch-InfoList-r14" in the foregoing signaling may be used to represent the original service configuration information list (sc-mtch-InfoList) carried on the SC-MCCH, and the list may provide configuration information of the carrier used for sending the multicast service. (Provides the configuration of each SC-MTCH in the current cell.)

"sc-mtch-InfoList-Enh-r15" in the foregoing signaling may be used to represent the enhanced service configuration information list (sc-mtch-InfoList-Enh) carried on the SC-MCCH. The E-UTRAN may configure, in sc-mtch-InfoList-Enh, a non-anchor carrier whose deployment mode is different from that of the anchor carrier. The non-anchor carrier may use the standalone deployment mode or the in-band deployment mode/the guard-band deployment mode. (E-UTRAN configures the downlink non-anchor carriers for which the mode of operation, standalone or inband/guard-band, is different from the anchor carrier in sc-mtch-Info-List-Enh.)

Specifically, "sc-mtch-InfoList-Enh-r15 SC-MTCH-Info-List-NB-r14" in the foregoing signaling may be used to represent that the enhanced service configuration information list (sc-mtch-InfoList-Enh) and the original service configuration information list (sc-mtch-InfoList) may be concatenated to form a new service configuration information list.

When a program instruction is executed in the at least one processor 410, the communications device 400 is enabled to implement a function on either of the network device and the terminal device in the communication method described in any one of the foregoing embodiments.

It should be understood that, the term "and/or" in the embodiments of the present application describes only an association relationship for describing associated objects and represents that three relationships may exist. For example, A and/or B may represent the following cases: Only A exists, both A and B exist, and only B exists. In addition, the character "/" in this specification generally indicates an "or" relationship between the associated objects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed by a network device, or, a chip for the network device, the method comprising:
    sending first configuration information to a terminal device, wherein the first configuration information comprises configuration information of a first non-anchor carrier;
    when it is determined that an anchor carrier is in a standalone deployment mode, the first non-anchor carrier uses one of an in-band deployment mode or a guard-band deployment mode;
    when it is determined that the anchor carrier is in one of an in-band deployment mode or a guard-band deployment mode, the first non-anchor carrier uses a standalone deployment mode;
    sending second configuration information to the terminal device, wherein the second configuration information comprises configuration information of a second non-anchor carrier; and
    wherein a sum of a quantity of carriers configured in the first configuration information and a quantity of carriers configured in the second configuration information is not greater than a maximum value of the quantity of carriers which can be configured in the second configuration information.

2. The method according to claim 1, wherein the method further comprises:
    when it is determined that the anchor carrier is in the in-band deployment mode, the second non-anchor carrier uses one of the in-band deployment mode or the guard-band deployment mode;
    when it is determined that the anchor carrier is in the guard-band deployment mode, the second non-anchor carrier uses one of the in-band deployment mode or the guard-band deployment mode;
    when it is determined that the anchor carrier is in the standalone deployment mode, the second non-anchor carrier uses the standalone deployment mode.

3. The method according to claim 1, wherein that when it is determined that an anchor carrier is in a standalone deployment mode, the first non-anchor carrier uses one of an in-band deployment mode or a guard-band deployment mode; and when it is determined that the anchor carrier is in one of an in-band deployment mode or a guard-band deployment mode, the first non-anchor carrier uses a standalone deployment mode comprises:
    when it is determined that the anchor carrier is in the standalone deployment mode, the first non-anchor carrier used for paging uses one of the in-band deployment mode or the guard-band deployment mode; or when it is determined that the anchor carrier is in one of the guard-band deployment mode or the in-band deployment mode, the first non-anchor carrier used for paging uses the standalone deployment mode.

4. The method according to claim 3, wherein the configuration information of the non-anchor carrier is carried ion a system information block (SIB) 22.

5. The method according to claim 1, wherein that when it is determined that an anchor carrier is in a standalone deployment mode, the first non-anchor carrier uses one of an in-band deployment mode or a guard-band deployment mode; and when it is determined that the anchor carrier is in one of an in-band deployment mode or a guard-band deployment mode, the first non-anchor carrier uses a standalone deployment mode comprises:

when it is determined that the anchor carrier is in the standalone deployment mode, the first non-anchor carrier used for random access uses one of the in-band deployment mode or the guard-band deployment mode;

when it is determined that the anchor carrier is in one of the guard-band deployment mode or the in-band deployment mode, the first non-anchor carrier used for random access uses the standalone deployment mode.

6. A communication method, performed by a terminal device, or, a chip for the terminal device, the method comprising:

receiving first configuration information from a network device, wherein the first configuration information comprises configuration information of a first non-anchor carrier;

when it is determined that the anchor carrier is in a standalone deployment mode, the first non-anchor carrier uses one of an in-band deployment mode or a guard-band deployment mode; and when it is determined that the anchor carrier is in one of an in-band deployment mode or a guard-band deployment mode, the first non-anchor carrier uses a standalone deployment mode;

receiving second configuration information from the network device, wherein the second configuration information comprises configuration information of a second non-anchor carrier; and wherein a sum of a quantity of carriers configured in the first configuration information and a quantity of carriers configured in the second configuration information is not greater than a maximum value of the quantity of carriers which can be configured in the second configuration information.

7. The method according to claim 6, wherein the method further comprises:

when it is determined that the anchor carrier is in the in-band deployment mode, the second non-anchor carrier uses one of the in-band deployment mode or the guard-band deployment mode; when it is determined that the anchor carrier is in the guard-band deployment mode, the second non-anchor carrier uses one of the in-band deployment mode or the guard-band deployment mode; and when it is determined that the anchor carrier is in the standalone deployment mode, the second non-anchor carrier uses the standalone deployment mode.

8. The method according to claim 6, wherein that when it is determined that the anchor carrier is in a standalone deployment mode, the first non-anchor carrier uses one of an in-band deployment mode or a guard-band deployment mode; and when it is determined that the anchor carrier is in one of an in-band deployment mode or a guard-band deployment mode, the first non-anchor carrier uses a standalone deployment mode comprises:

concatenating the first configuration information behind the second configuration information, to form third configuration information; and selecting, from the third configuration information, the first non-anchor carrier used for paging, wherein when it is determined that the anchor carrier is in the standalone deployment mode, the first non-anchor carrier used for paging uses the in-band deployment mode or the guard-band deployment mode; or when it is determined that the anchor carrier is in one of the guard-band deployment mode or the in-band deployment mode, the first non-anchor carrier used for paging uses the standalone deployment mode.

9. The method according to claim 8, wherein the configuration information of the non-anchor carrier is carried in a system information block (SIB) 22.

10. The method according to claim 6, wherein that when it is determined that the anchor carrier is in a standalone deployment mode, the first non-anchor carrier uses one of an in-band deployment mode or a guard-band deployment mode; when it is determined that the anchor carrier is in one of an in-band deployment mode or a guard-band deployment mode, the first non-anchor carrier uses a standalone deployment mode comprises:

concatenating the first configuration information behind the second configuration information, to form third configuration information; and selecting, from the third configuration information, the first non-anchor carrier used for random access, wherein when it is determined that the anchor carrier is in the standalone deployment mode, the first non-anchor carrier used for random access uses one of the in-band deployment mode or the guard-band deployment mode;

when it is determined that the anchor carrier is in the guard-band deployment mode or the in-band deployment mode, the first non-anchor carrier used for random access uses the standalone deployment mode.

11. An apparatus, applied to a network device, comprising:

at least one processor, wherein when instructions are executed by the at least one processor, the instructions cause the apparatus to perform operations comprising:

sending, first configuration information to a terminal device, wherein the first configuration information comprises configuration information of a first non-anchor carrier; and when it is determined that an anchor carrier is in a standalone deployment mode, the first non-anchor carrier uses one of an in-band deployment mode or a guard-band deployment mode; and when it is determined that the anchor carrier is in one of an in-band deployment mode or a guard-band deployment mode, the first non-anchor carrier uses a standalone deployment mode;

sending, second configuration information to the terminal device, wherein the second configuration information comprises configuration information of a second non-anchor carrier; and wherein a sum of a quantity of carriers configured in the first configuration information and a quantity of carriers configured in the second configuration information is not greater than a maximum value of the quantity of carriers which can be configured in the second configuration information.

12. The apparatus according to claim 11, wherein the instructions further cause the apparatus to perform operations comprising:
when it is determined that the anchor carrier is in the in-band deployment mode, the second non-anchor carrier uses one of the in-band deployment mode or the guard-band deployment mode; when it is determined that the anchor carrier is in the guard-band deployment mode, the second non-anchor carrier uses one of the in-band deployment mode or the guard-band deployment mode; and when it is determined that the anchor carrier is in the standalone deployment mode, the second non-anchor carrier uses the standalone deployment mode.

13. The apparatus according to claim 11, wherein that when it is determined that an anchor carrier is in a standalone deployment mode, the first non-anchor carrier uses one of an in-band deployment mode or a guard-band deployment mode; when it is determined that the anchor carrier is in one of an in-band deployment mode or a guard-band deployment mode, the first non-anchor carrier uses a standalone deployment mode comprises:
when it is determined that the anchor carrier is in the standalone deployment mode, the first non-anchor carrier used for paging uses one of the in-band deployment mode or the guard-band deployment mode; or
when it is determined that the anchor carrier is in one of the guard-band deployment mode or the in-band deployment mode, the first non-anchor carrier used for paging uses the standalone deployment mode.

14. The apparatus according to claim 13, wherein the configuration information of the non-anchor carrier is carried in a system information block (SIB) 22.

15. The apparatus according to claim 11, wherein that when it is determined that an anchor carrier is in a standalone deployment mode, the first non-anchor carrier uses one of an in-band deployment mode or a guard-band deployment mode; when it is determined that the anchor carrier is in one of an in-band deployment mode or a guard-band deployment mode, the first non-anchor carrier uses a standalone deployment mode comprises:
when it is determined that the anchor carrier is in the standalone deployment mode, the first non-anchor carrier used for random access uses one of the in-band deployment mode or the guard-band deployment mode;
when it is determined that the anchor carrier is in one of the guard-band deployment mode or the in-band deployment mode, the first non-anchor carrier used for random access uses the standalone deployment mode.

16. An apparatus, applied to a terminal device, comprising:
at least one processor;
wherein when instructions are executed by the at least one processor, the instructions cause the apparatus to perform operations comprising:
receiving, first configuration information from a network device, wherein the first configuration information comprises configuration information of a first non-anchor carrier; and when it is determined that an anchor carrier is in a standalone deployment mode, the first non-anchor carrier uses one of an in-band deployment mode or a guard-band deployment mode; when it is determined that the anchor carrier is in one of an in-band deployment mode or a guard-band deployment mode, the first non-anchor carrier uses a standalone deployment mode,
receiving, second configuration information from the network device, wherein the second configuration information comprises configuration information of a second non-anchor carrier; and
wherein a sum of a quantity of carriers configured in the first configuration information and a quantity of carriers configured in the second configuration information is not greater than a maximum value of the quantity of carriers which can be configured in the second configuration information.

17. The apparatus according to claim 16, wherein the instructions further cause the apparatus to perform operations comprising:
when it is determined that the anchor carrier is in the in-band deployment mode, the second non-anchor carrier uses one of the in-band deployment mode or the guard-band deployment mode; when it is determined that the anchor carrier is in the guard-band deployment mode, the second non-anchor carrier uses one of the in-band deployment mode or the guard-band deployment mode; and when it is determined that the anchor carrier is in the standalone deployment mode, the second non-anchor carrier uses the standalone deployment mode.

18. The apparatus according to claim 16, wherein the instructions further cause the apparatus to perform operations comprising:
wherein that when it is determined that an anchor carrier is in a standalone deployment mode, the forst non-anchor carrier uses one of an in-band deployment mode or a guard-band deployment mode; when it is determined that the anchor carrier is in an in-band deployment mode or a guard-band deployment mode, the first non-anchor carrier uses a standalone deployment mode comprises:
concatenating, the first configuration information behind the second configuration information, to form third configuration information; and
selecting, from the third configuration information, the first non-anchor carrier used for paging, wherein when it is determined that the anchor carrier is in the standalone deployment mode, the first non-anchor carrier used for paging uses one of the in-band deployment mode or the guard-band deployment mode; and
when it is determined that the anchor carrier is in one of the guard-band deployment mode or the in-band deployment mode, the first non-anchor carrier used for paging uses the standalone deployment mode.

19. The apparatus according to claim 18, wherein the configuration information of the non-anchor carrier is carried in a system information block (SIB) 22.

20. The apparatus according to claim 16, wherein the instructions further cause the apparatus to perform operations comprising:
wherein that when an it is determined that an anchor carrier is in a standalone deployment mode, the first non-anchor carrier uses one of an in-band deployment mode or a guard-band deployment mode; when it is determined that the anchor carrier is in an in-band deployment mode or a guard-band deployment mode, the first non-anchor carrier uses a standalone deployment mode comprises:

concatenating, the first configuration information behind the second configuration information, to form third configuration information; and selecting, from the third configuration information, the first non-anchor carrier used for random access, wherein when it is determined that the anchor carrier is in the standalone deployment mode, the first non-anchor carrier used for random access uses one of the in-band deployment mode or the guard-band deployment mode; and when it is determined that the anchor carrier is in one of the guard-band deployment mode or the in-band deployment mode, the first non-anchor carrier used for random access uses the standalone deployment mode.

* * * * *

UNITED STATES PATENT AND TRADEMARK OFFICE
CERTIFICATE OF CORRECTION

PATENT NO. : 12,028,879 B2  
APPLICATION NO. : 16/990672  
DATED : July 2, 2024  
INVENTOR(S) : Baokun Shan Page 1 of 1

It is certified that error appears in the above-identified patent and that said Letters Patent is hereby corrected as shown below:

In the Claims

Claim 4: Column 21, Line 8: reads as "ration information of the non-anchor carrier is carried ion a" should read as -- ration information of the non-anchor carrier is carried in a --.

Claim 6: Column 21, Line 33: reads as "when it is determined that the anchor carrier is in a" should read as -- when it is determined that an anchor carrier is in a --.

Claim 18: Column 24, Line 33: reads as "is in a standalone deployment mode, the forst non-" should read as -- is in a standalone deployment mode, the first non- --.

Signed and Sealed this  
Sixth Day of May, 2025

Coke Morgan Stewart  
*Acting Director of the United States Patent and Trademark Office*